United States Patent [19]

Mikami et al.

[11] Patent Number: 5,254,606
[45] Date of Patent: * Oct. 19, 1993

[54] SURFACE-PROTECTIVE AGENT

[75] Inventors: Ryuzo Mikami; Tadashi Okawa, both of Ichihara, Japan

[73] Assignee: Dow Corning Toray Silicone Co., Ltd., Tokyo, Japan

[ * ] Notice: The portion of the term of this patent subsequent to Jan. 21, 2009 has been disclaimed.

[21] Appl. No.: 758,030

[22] Filed: Sep. 12, 1991

Related U.S. Application Data

[63] Continuation-in-part of Ser. No. 522,753, May 11, 1990, Pat. No. 5,082,916.

[30] Foreign Application Priority Data

Sep. 13, 1990 [JP] Japan ................................. 2-242894

[51] Int. Cl.$^5$ ............................................. C08K 5/54
[52] U.S. Cl. ............................. 523/522; 524/268; 524/731; 525/446; 525/29; 528/15; 528/26; 528/31; 427/387; 427/407.1

[58] Field of Search .............. 528/26, 15, 31; 525/446; 524/268, 731; 523/522; 427/387, 407.1

[56] References Cited

U.S. PATENT DOCUMENTS

| | | | |
|---|---|---|---|
| 3,674,891 | 4/1972 | Wheeler | 525/446 |
| 4,278,574 | 7/1981 | Dworak et al. | 525/101 |
| 4,336,358 | 6/1982 | Alberts | 525/439 |
| 4,613,641 | 9/1986 | Haubennestel | 524/267 |
| 4,725,658 | 2/1988 | Thayer et al. | 528/15 |
| 5,082,916 | 1/1992 | Mikami et al. | 528/26 |

FOREIGN PATENT DOCUMENTS 377370 7/1990 European Pat. Off. .

*Primary Examiner*—Ralph H. Dean, Jr.
*Attorney, Agent, or Firm*—Alexander Weitz; Richard I. Gearhart

[57] ABSTRACT

A graft type silicone-modified polyester forms a base for a surface-protective agent which has excellent water-repellency properties as well as retention of said properties after exposure to the environment.

21 Claims, No Drawings

SURFACE-PROTECTIVE AGENT

This application is a continuation-in-part of Ser. No. 522,753, filed on May 11, 1990 and now U.S. Pat. No. 5,082,916, both applications being subject to an obligation of assignment to a common assignee at the time the inventions were made.

FIELD OF THE INVENTION

The present invention relates to a surface-protective agent. More particularly, the invention relates to a surface-protective agent based on a silicone-modified polyester.

BACKGROUND OF THE INVENTION

The exterior painted surfaces of automobiles, various other types of vehicles, airplanes, bridges, buildings and the like, undergo quality changes (deterioration) with the passage of time as a consequence of exposure to water, ultraviolet radiation, ozone, and so forth. In response to this, numerous surface-protective agents have been proposed for the purpose of protecting these painted surfaces. For example, the use of polydimethylsiloxane-containing wax compositions as surface-protective agents for automobiles (car wax) in quite familiar. However, while these car waxes exhibit an excellent initial water repellency, this water repellency is lost with time, i.e., their water-repellency retention is poor. Silicone resin-blended wax compositions have also been proposed. While these compositions have a better water-repellency retention than polydimethylsiloxane-containing wax compositions, it can still not be said that their performance in this regard is entirely satisfactory. In order to eliminate the effect of ultraviolet radiation, which is one cause of the deterioration under consideration, it has also been proposed that the wax composition additionally contain an additive such as an ultraviolet absorber. Unfortunately, these additives are in all cases low-molecular-weight organic compounds, and they are readily eluted or washed out within a short period of time under the influence of rain. The retention or maintenance of their effect is thus again poor. An additional problem is that commercial car waxes, typically being pastes or solids, require the expenditure of substantial effort for their application to the painted surfaces. Thus, not only does waxing require a wiping-off step, but waxing must be done frequently in order to retain the water repellency. These work inputs to be borne by the car owner are by no means trivial.

SUMMARY OF THE INVENTION

The present inventors carried out extensive research directed at solving the aforementioned problems, and the present invention was achieved as a result.

Thus, the present invention takes as its object the introduction of a surface-protective agent which not only evidences an excellent water repellency on the near term, but which also strongly retains its water repellency even upon long-term exposure in a hostile ambient.

The aforesaid object is achieved by using a surface-protective agent which is characteristically based on silicone-modified polyester in which polyorganosiloxane is grafted onto a polyester.

DETAILED DESCRIPTION OF THE INVENTION

To explain the preceding in greater detail, the silicone-modified polyester employed by the present invention is the principal or base component of the surface-protective agent according to the present invention. From the standpoint of chemical structure, this silicone-modified polyester comprises polyester onto which polyorganosiloxane has been grafted. The polyester moiety in this silicone-modified polyester will generally consist of the condensate of a polyvalent carboxylic acid and a polyvalent alcohol. The polyvalent carboxylic acid in this context is exemplified by adipic acid, phthalic anhydride, isophthalic acid, terephthalic acid, and so forth. The polyvalent alcohol is exemplified by ethylene glycol, neopentyl glycol, trimethylolpropane, trimethylolethane, trimethylolpropane monoallyl ether, trimethylolethane monoallyl ether, glycerol, glycerol monoallyl ether, pentaerythritol, pentaerythritol monoallyl ether, pentaerythritol diallyl ether, and so forth. In addition, the organic groups in the polyorganosiloxane moiety comprising the silicone-modified polyester are exemplified by alkyl groups such as methyl, ethyl and propyl; substituted alkyl groups, such as 3,3,3-trifluoropropyl; and aryl groups, such as phenyl.

Many methods are already available for the preparation of the silicone-modified polyester under consideration. For example, in order to prepare silicone-modified polyester having side-chain polyorganosiloxane, one has recourse to the method in which polyvalent carboxylic acid (or its acid chloride) is condensed with polyorganosiloxane that has 2 carbinol groups at one molecular chain terminal. The same type of silicone-modified polyester can also be obtained by the reaction of polyvalent alcohol with polyorganosiloxane that has 2 carboxyl groups at one terminal. Silicone-modified polyester can also be obtained by the condensation of carbinol-containing polyester resin with polyorganosiloxane having the hydroxyl group, silicon-bonded hydrogen atom, or a hydrolyzable group (e.g., alkoxy) at one terminal. The inventors have themselves already proposed a method within this sphere (Japanese Patent Application Number 01-138041 [138,041/89], U.S. patent application Ser. No. 07/522,753 filed May 11, 1990, now U.S. Pat. No. 5,082,916). The entire specification of this U.S. patent is hereby incorporated by reference. In this method, aliphatically unsaturated polyester is first synthesized and is then addition reacted, in the presence of a platinum-type compound catalyst, with polyorganosiloxane carrying SiH at one molecular chain terminal. The product is a silicone-modified polyester which carries side-chain polyorganosiloxane. Among the preceding methods, the lattermost method is preferred for the preparation of silicone-modified polyester for use in the present invention because it affords silicone-modified polyester with the intended molecular design by the introduction under very mild conditions of side-chain polyorganosiloxane into a previously synthesized polyester. The following compounds are provided as examples of polyorganosiloxanes which may be used in the preceding methods, wherein Me hereinafter denotes a methyl radical.

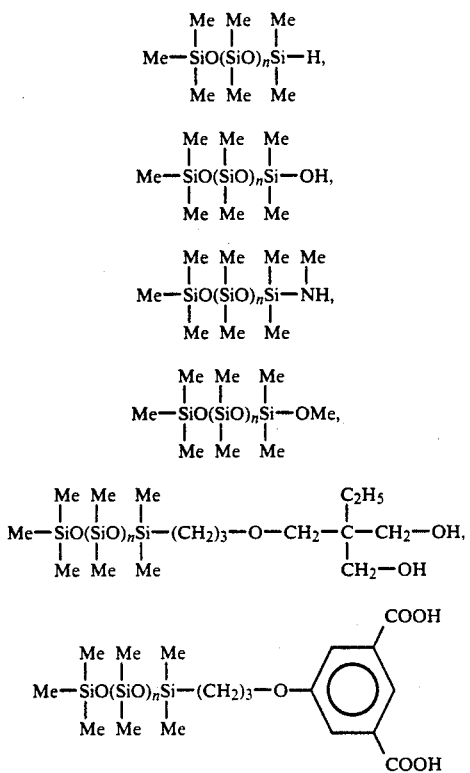

The use of aromatic polyester as the polyester moiety imparts ultraviolet absorptivity and affords a harder silicone-modified polyester. Accordingly, the use of this type of silicone-modified polyester is preferred where such properties are critical.

The surface-protective agent according to the present invention is formulated by dissolving the above-described silicone-modified polyester in any of the various solvents already known for the dissolution of organopolysiloxanes and polyesters. In a particularly preferred execution, the above-described silicone-modified polyester is dissolved in a volatile low-molecular-weight silicone compound. The use of a volatile low-molecular-weight silicone compound not only prevents attack against the exterior painted surfaces of the car, but also makes possible the facile application of the silicone-modified polyester to the painted surface in a thin and uniform manner.

When the surface-protective agent of the present invention as described hereinbefore is applied to the exterior painted surfaces of automobiles or other vehicles, the silicone-modified polyester tightly adheres to the painted surface and forms a water-repellent film. Since the grafted polyorganosiloxane localizes at the air surface due to its interfacial properties, the film can maintain an excellent water repellency for long periods of time. Accordingly, the surface-protective agent according to the present invention will be useful where such a property profile is critical.

EXAMPLE

The present invention will be explained in greater detail through the following illustrative example, in which parts=weight parts.

In the illustrative example, the water repellency was evaluated according to the following test method.

Water Repellency

The water repellency was evaluated after a small quantity of water had been sprinkled on the already applied film.

| | |
|---|---|
| ++ | excellent water repellency, fine water droplets |
| + | water repellency is exhibited, but water droplets are larger |
| x | poor water repellency, at least partial wetting |

REFERENCE EXAMPLE 1

Synthesis of Silicone-Modified Polyester

Isophthalic acid (290.4 parts), glycerol monoallyl ether (58.7 parts), neopentyl glycol (174.7 parts), and xylene (35 parts) were introduced into a four-neck flask equipped with a stirrer, nitrogen-inlet tube, thermometer, and a reflux condenser equipped with a distillation tube. The temperature was gradually raised to 230 degrees Centigrade under a nitrogen stream. While maintaining this temperature, the water produced by the condensation reaction was removed via the distillation tube. Sampling was carried out at regular intervals and the acid value was measured. The reaction was terminated when the acid value fell to 5 or below. The polyester product was a light yellow solid at room temperature. This polyester contained 1.6 weight % terminal carbinol groups, and its molecular weight calculated on this basis was 2,125.

The following were then introduced into a four-neck flask equipped with a stirrer, thermometer, and reflux condenser: 100 parts polyester prepared as above, 100 parts polyorganosiloxane I with the chemical structure given below, and 500 parts tetrahydrofuran.

polyorganosiloxane I (molecular weight=1,821)

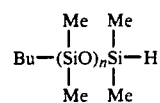

wherein Me represents a methyl radical and Bu is a butyl radical.

The temperature was gradually raised to the boiling point of the tetrahydrofuran while stirring. Then, while maintaining reflux, the reaction was conducted by the addition of sufficient 1 weight % solution of chloroplatinic acid in tetrahydrofuran to give 5 parts chloroplatinic acid per 1,000,000 parts total reaction mixture. Sampling was carried out at regular intervals, and the development of the reaction was measured by an examination of reaction mixture compatibility. In order to evaluate the compatibility, the sampled reaction mixture was applied to a glass plate, and the transparency was evaluated on the film produced by volatilization of the solvent from the reaction mixture. The reaction was terminated when a transparent reaction mixture was obtained. After completion of the reaction, the low boilers were removed by distillation to afford a light yellow, transparent, and solid silicone-modified polyester which exhibited a softening point. This silicone-modified polyester had a carbinol content of 0.8 weight %.

EXAMPLE 1

A surface-protective agent was prepared by dissolving 10 parts of the silicone-modified polyester prepared in Reference Example 1 in 90 parts octamethylcyclotetrasiloxane. This surface-protective agent was then applied to the right half of the painted surface of the hood of a passenger automobile and was allowed to stand without further treatment. The water repellency was then evaluated immediately after application, after standing for 1 month, and after standing for 2 months. The results are reported in Table 1. For comparison, a commercial car wax was applied to the left half of the same hook, and its water repellency was similarly evaluated. These results are also reported in Table 1.

After two months, the painted surface which had been treated with surface-protective agent according to the present invention was wiped with a cloth impregnated with octamethylcyclotetrasiloxane. The dirt adhering to this painted surface was easily removed, and an excellent water repellency re-appeared. These effects were due to the strong adherence by the silicone-modified polyester to the painted surface.

TABLE 1

|  | present invention | comparison example |
| --- | --- | --- |
| initial | ++ | ++ |
| after 1 month | ++ | x |
| after 2 months | + | x |

We claim:

1. A surface-protective agent comprising a solvent solution of a silicone-modified polyester prepared by reacting, in the presence of an effective amount of a hydrosilylation catalyst,
   (A) a polyester containing at least one alkenyl group and having no unsaturated terminal groups, said polyester having a number average molecular weight of about 500 to about 5,000; and
   (B) an organopolysiloxane containing one hydrosilyl group.

2. The surface-protective agent according to claim 1, wherein said organopolysiloxane (B) is polydimethylsiloxane.

3. The surface-protective agent according to claim 2, wherein said polydimethylsiloxane (B) is a straight chain structure having a hydrosilyl group at one end of the chain and the ratio of components (A) and (B) is fixed so as to provide approximately one hydrosilyl group for reaction with each alkenyl group.

4. The surface-protective agent according to claim 3, wherein the degree of polymerization of said polydimethylsiloxane (B) is about 5 to 50.

5. The surface-protective agent according to claim 1, wherein said solvent is a volatile silicone compound.

6. The surface-protective agent according to claim 5, wherein said volatile silicone compound is octamethylcyclotetrasiloxane.

7. The surface-protective agent according to claim 2, wherein said solvent is a volatile silicone compound.

8. The surface-protective agent according to claim 7, wherein said volatile silicone compound is octamethylcyclotetrasiloxane.

9. The surface-protective agent according to claim 4, wherein said solvent is a volatile silicone compound.

10. The surface-protective agent according to claim 9, wherein said volatile silicone compound is octamethylcyclotetrasiloxane.

11. A method for protecting a painted surface comprising coating said surface with the surface-protective agent according to claim 1.

12. A method for protecting a painted surface comprising coating said surface with the surface-protective agent according to claim 2.

13. A method for protecting a painted surface comprising coating said surface with the surface-protective agent according to claim 3.

14. A method for protecting a painted surface comprising coating said surface with the surface-protective agent according to claim 4.

15. A method for protecting a painted surface comprising coating said surface with the surface-protective agent according to claim 5.

16. A method for protecting a painted surface comprising coating said surface with the surface-protective agent according to claim 6.

17. A method for protecting a painted surface comprising coating said surface with the surface-protective agent according to claim 7.

18. A method for protecting a painted surface comprising coating said surface with the surface-protective agent according to claim 8.

19. A method for protecting a painted surface comprising coating said surface with the surface-protective agent according to claim 9.

20. A method for protecting a painted surface comprising coating said surface with the surface-protective agent according to claim 10.

21. The method according to claim 11, wherein said surface is that of an automobile.

* * * * *